United States Patent [19]
Gorissen et al.

[11] Patent Number: 6,105,120
[45] Date of Patent: Aug. 15, 2000

[54] METHOD FOR IMPLEMENTING MULTIPLE FORMAT ADDRESSING IN AN EMBEDDED MICROCONTROLLER, A COMPILER BEING ARRANGED FOR IMPLEMENTING THE METHOD, AND A MICROCONTROLLER BEING ARRANGED FOR USING THE METHOD AND COMPILER

[75] Inventors: Paulus M. H. M. A. Gorissen; Alexander Augusteijn, both of Eindhoven; Eelco J. Dijkstra, Winsum, all of Netherlands

[73] Assignee: U.S. Philips Corporation, New York, N.Y.

[21] Appl. No.: 08/935,565

[22] Filed: Sep. 24, 1997

[30] Foreign Application Priority Data

Jan. 28, 1997 [EP] European Pat. Off. ............. 97200203

[51] Int. Cl.⁷ .................................................. G06F 12/02
[52] U.S. Cl. .......................................... 711/220; 711/212
[58] Field of Search .................................. 711/103, 104, 711/220, 212

[56] References Cited

U.S. PATENT DOCUMENTS 4,869,184   9/1989   Hisatake et al. ........................... 112/78
5,561,788  10/1996   Letwin ................................ 395/500.43

FOREIGN PATENT DOCUMENTS

WO 9412929   6/1994   WIPO .

OTHER PUBLICATIONS

"iC–86/286/386 Compiler User's Guide for FAX/VMS Systems", pp. 4–18/19 and 4–29 through 4–39, Intel Santa Clara, CA 1991.

"Zortech C++ Compiler V3.0; Microsoft Windows Function Reference", Symantec Corporation, Cupertino, CA 1991, p. 749–753.

"Zortech C++ Compiler V3.0; Function Reference", Symantec Corporation, Cupertino, CA 1991, pp. 369–374.

"American National Standard for Infioramtion Systems—Programming Language C", Ansi-C X3.159–1989 American National Standards Institute, New York, USA, p. 37, 38, 50.

"Rationale for American National Standard for Information Systems—Programming Language—C (ANSI-C)" p. 74.

Primary Examiner—Hiep T. Nguyen
Attorney, Agent, or Firm—Gregory L. Thorne

[57] ABSTRACT

Multiple format addressing is implemented in a microcontroller that has both ROM and RAM memory facility, processing facility, and bus facility for interconnecting the memory and processing facilities, through using a low address field for local addressing, and at least one facultative high address field for extended addressing. In particular, the high address field is provided in a first addressing format as a segment address, and in a second addressing format as containing a RAM/ROM selection bit. More in particular, the high address field can be provided in a third addressing format as containing a RAM/ROM selection bit and a segment address in respective mutually exclusive fields.

22 Claims, 2 Drawing Sheets

METHOD FOR IMPLEMENTING MULTIPLE FORMAT ADDRESSING IN AN EMBEDDED MICROCONTROLLER, A COMPILER BEING ARRANGED FOR IMPLEMENTING THE METHOD, AND A MICROCONTROLLER BEING ARRANGED FOR USING THE METHOD AND COMPILER

BACKGROUND OF THE INVENTION

The invention relates to a method for implementing multiple format addressing in a microcontroller that has both ROM and RAM memory facility, processing facility, and bus facility for interconnecting the memory and processing facilities. A low address field is used for local addressing, and at least one facultative high address field is used for extended addressing. Many standard type microcontrollers use a sixteen-bit address space. However, present day practice has seen the necessity for extending this address space. Intel Corporation has solved this problem by introducing so-called type pointers that distinguish between two types of addresses, to wit a sixteen-bit so-called near-address, as being different from a compound address that contains an eight-bit segment address and further a sixteen-bit low-significance address. A useful reference in this respect is iC-86/286/386 Compiler User's Guide for VAX/VMS Systems, pages 4-18/19 and 4-29 through 4-39, Intel Santa Clara Calif. 1991. Although with this organization various different memory configurations and memory sizes can be addressed, discriminating between ROM and RAM necessitates various different steps and various different address interpretations. For example, p.4-29 lists no less than nine different cases that must be handled. Furthermore, this organization is not very attractive for programming in embedded systems, because the difference between addressing data RAM and program ROM is not immediately clear, whereas in particular embedded systems frequently use an interspersed string of these two categories. Such embedded microcontrollers are often used as mere subaltern tools in comprehensive systems of a much greater degree of complexity.

Note that according to the Intel setup, segments could be mutually overlapping, in that the displacement of the header address between two successive segments is less than the length of the previous segment. Even this complicating feature can be taken into account by the present invention, as hereinafter explained.

SUMMARY OF THE INVENTION

Accordingly, amongst other things it is an object of the invention to provide a multiple format addressing organization for an elementary microcontroller that allows both to distinguish between addressing program and addressing data and also to address small program ranges as well as large ones. Now, according to a first aspect of the invention, said high address field is provided in a first addressing format as a segment address and in a second addressing format as containing a RAM/ROM selection bit. The inventors have found that in this manner programming of the microcontroller is extremely flexible in that certain addresses can be promoted as it were, for use in another environment that needs longer addresses.

Advantageously, the method also provides said high address field in a third addressing format containing a RAM/ROM selection bit and a segment address in respective mutually exclusive fields. In this manner four different addressing formats can be used together to cope with all different cases.

Advantageously, said RAM/ROM selection bit shares an elementary information unit with a straight address extension. Even without implementing segmentation, this feature allows a larger address space.

Advantageously, the method has promotion facility for promoting a *_small pointer to a *_big pointer. Herein, the asterisk * indicates don't care between RAM and ROM. This promotion is being supported by a typing system, as will be discussed more extensively with reference to FIG. 3 hereinafter. In particular, the promoting is effected automatically, so that the programming needs no specific instructions in this respect.

Advantageously, the method provides joining facility for joining a first format _ram_* pointer and a first format _rom_* pointer to a unified _* pointer of identical format as said first format. Herein, the asterisk * indicates a don't care between "small" and "big". With respect to other pairs of pointer types, the same automatic promoting is effected here.

The invention also relates to a compiler program for implementing the above method. The invention also relates to a microcontroller for using the method and compiler according to the above. By itself, a compiler is a common facility in information technology. The side by side provision of the above recited pointer formats within a single compiling environment significantly improves effectivity through consistent simplification. To the inventors' knowledge the range of formats has nowhere been combined before, but has always been treated in mutually distinct and separate environments. A microcontroller that is able to use the above features does not need complex enhanced facilities, but only should assign an extra register in case of longer addressing formats. It also should have a feature for recognizing the RAM/ROM selection bit that according to the above may reside in two different positions. These may however be located at identical displacements from the head of the address word.

Further advantageous aspects of the invention are indicated hereinafter.

BRIEF DESCRIPTION OF THE DRAWINGS

These and other aspects and advantages of the invention will be discussed in more in detail with reference to the description of preferred embodiments, and in particular with reference to the appended Figures that show.

DETAILED DESCRIPTION OF PREFERRED EMBODIMENTS

Figure 1:
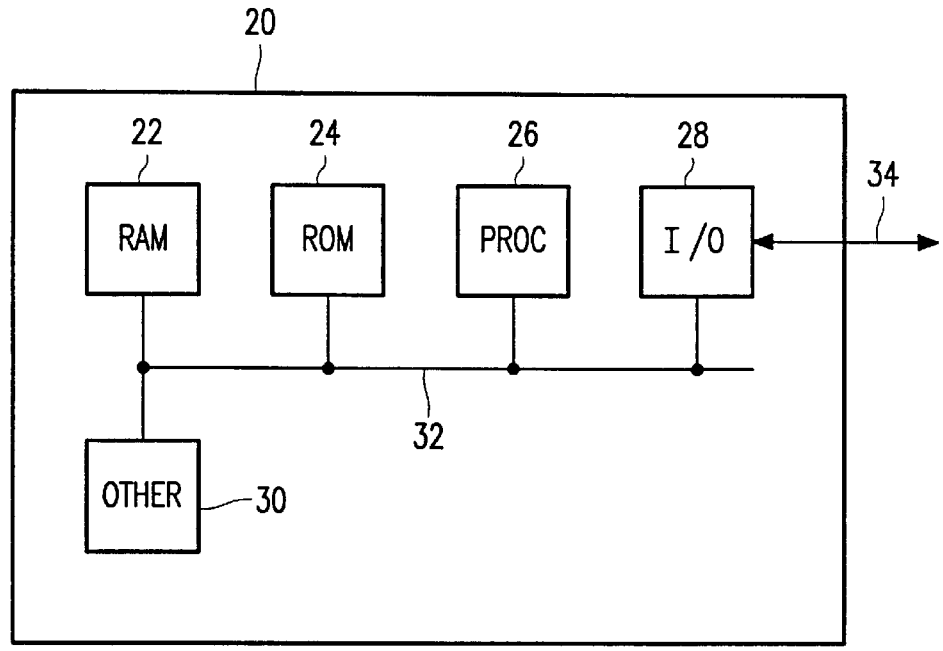
FIG. 1 an embedded microcontroller.

FIG. 1 shows an embedded microcontroller 20. The detailed structure has been considered state of the art. General subsystems of the microcontroller are random access memory 22 mainly for storing data, read-only memory 24 mainly for storing program or code, processor facility 26 to process data under control of programming instructions, I/O facility 28 for communicating information with the external world on interconnection 34. The above subsystems are interconnected by means of bus facility 32. Furthermore, the integrated electronic structure contains further electronic processing means symbolized by block 30; in a television application this could be a large video RAM, but many other instances would be viable. By themselves elements of block 30 are no part of the invention. In the embodiment hereinafter, the smallest item that is communicated between the various subsystems is an eight-bit byte, but naturally, various other sizes of information granularity are feasible.

Figure 2:
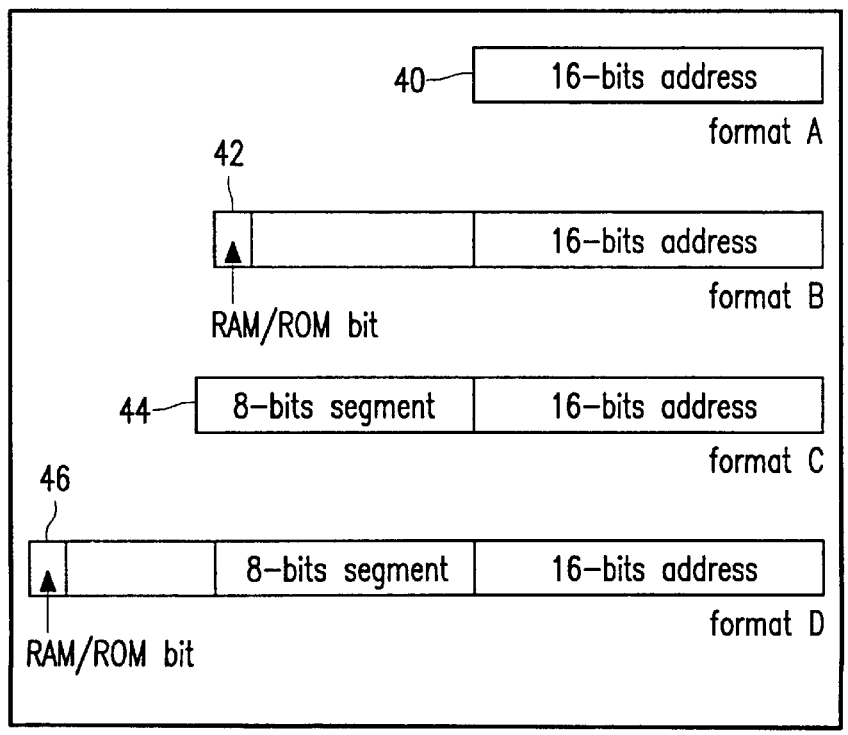
FIG. 2 the four formats used to join solutions.

FIG. 2 shows the four different address formats that are in the most extensive embodiment according to the invention used to join the various solutions. Format A 40 is a straight 16-bit low order address that has a single field for local addressing of 64 k different addresses. Format B 42 has the same 16-bit low address field. In addition it has 8 high-significance bits of which one bit (as shown it is the most significant one, but generally this is not a strict requirement) discriminates between data RAM and program ROM. By itself, the separate addressing of RAM and ROM is conventionally called a Harvard architecture. In principle, the remainder of this byte may be left unused, but alternatively as shown, the next 7 bits may accommodate for addressing a multiplicity of different address spaces that each may contain a respective amount of 64 k addresses. Format C 44 again has the same 16-bit low address field but in addition a high-significant 8-bit segment field that may address 256 different segments. Format D 46 combines all of the above facilities in that it has first the RAM/ROM discrimination bit, second a facultative space for a 7-bit extended addressing, next an 8-bit segment address and finally the 16-bit low-order address. As before, the RAM/ROM discrimination may be done by another bit.

The Promotability of Pointers

With these four formats, we may define the promotion or conversion of pointers. It is clear that between certain pairs of formats a promotion is impossible. For example, translating a __far pointer with non zero segment into a __near pointer is impossible since this implies losing the segment information. So when defining the promotion rules, we should identify when they are applicable, and how they will change one format into an other.

Figure 3:
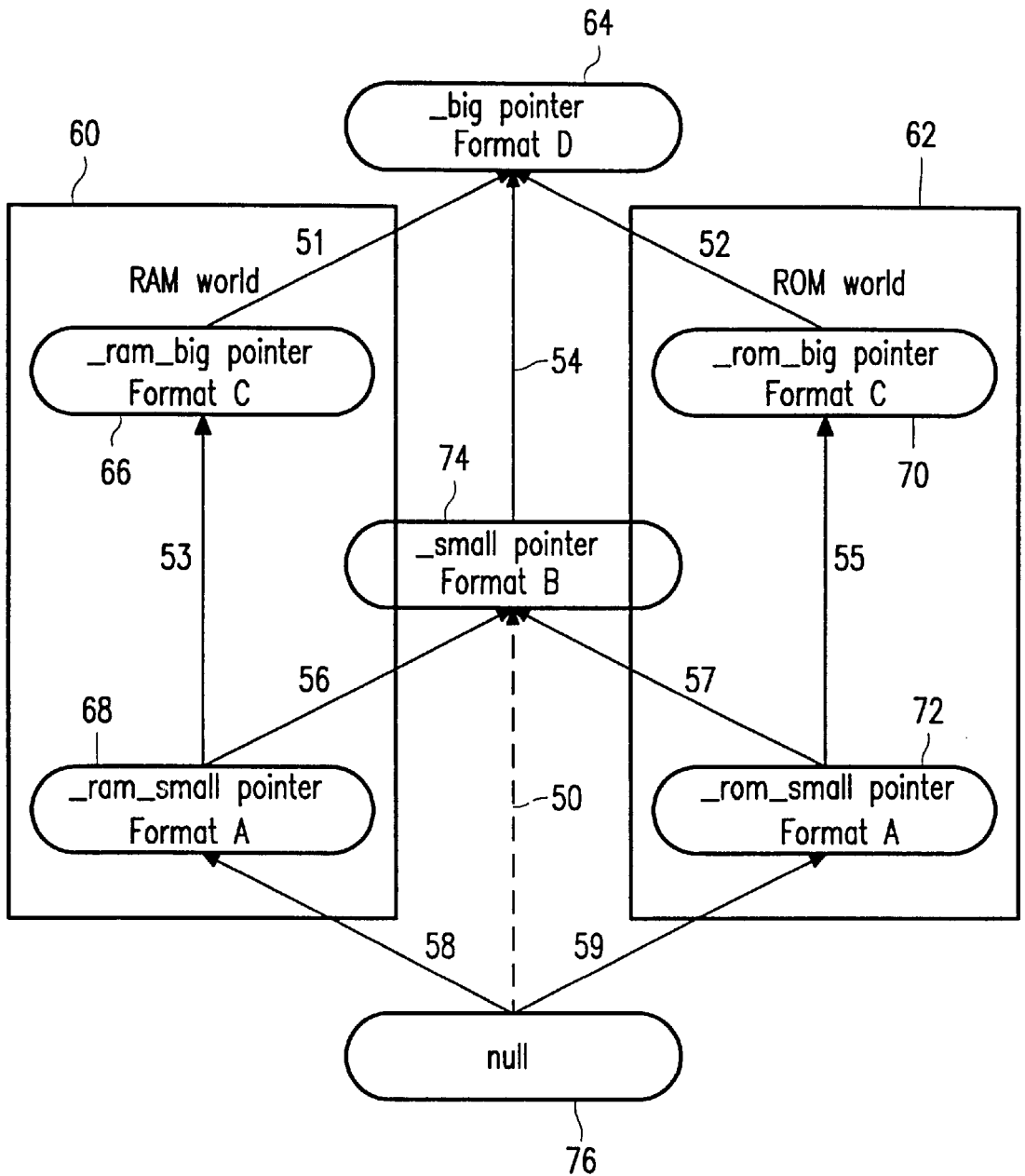
FIG. 3 the lattice showing the interconnection and promotion modes among the various pointer formats.

FIG. 3 presents a diagram of possible promotions and conversions. Each numbered arrow represents a promotion or conversion. The Figure actually is a directed graph with seven pointer blocks 64–76, inclusive of a null pointer block 76 at the bottom of the Figure. The pointer blocks are joined by straight conversion or promotion arrows 51–59, and furthermore by a discretive arrow between null pointer block 76 and __small pointer block 74. The latter will be considered more in detail hereinafter. Two subsets of the pointer blocks are labelled as the RAM world 60 and the ROM world 62, respectively, whereas the other pointer blocks are non-discriminative between these two worlds.

In the Figure no idiosyncratic terminology has been used, since this would leave one or more nodes without a name for a pointer type. It is feasible to forego the use of a const (=constant, either in RAM or in ROM). In this manner, the model allows to have a const in RAM which conforms to the ANSI-C standard referred to hereinafter. Standard analysis of the diagram makes clear that it is in fact a Cartesian product between {ram, rom, union_of_ram_rom} and {small, big}.

Now there is a difference between direct and indirect promotions. All direct promotions are shown as a single directed arrow. Indirect promotions are promotions via two or more such directed arrows in series.

Direct Promotions

An enumeration of all direct promotions is given. The enumeration numbers corresponds to the arrow number.

51. Promotion from a __ram__big pointer into a __big pointer. This is a transition from format C to format D. The 16-bit page address of format D is set to the 16-bit page address of format C, the segment of format D is set to the segment of format C, and by setting the RAM/ROM bit of format D indicating that it is a RAM pointer the promotion is implemented.

52. Promotion from a __rom__big pointer into a __big pointer. It is a transition from format C to format D. The 16-bit page address of format D is set to the 16-bit page address of format C, the segment of format D is set to the segment of format C, and by setting the RAM/ROM bit of format D indicating that it is a ROM pointer the promotion is implemented.

53. Promotion from a __ram__small pointer into a __ram__big pointer. It is a transition from format A to format C. The 16-bit page address of format A is set to the 16-bit page address of format C, and by setting the segment number to 0 the promotion is implemented.

54. Promotion from a __small pointer into a __big pointer. It is a transition from format B to format D. The 16-bit page address of format B is set to the 16-bit page address of format D, the RAM/ROM bit of format D is set to the RAM/ROM bit of format B, and by setting the segment number to 0 the promotion is implemented.

55. Promotion from a __rom__small pointer into a __rom__big pointer. It is transition from format A to format C. The 16-bit page address of format A is set to the 16-bit page address of format C, and by setting the segment number to 0 the promotion is implemented.

56. Promotion from __ram__small pointer into a __small pointer. It is a transition from format A to format B. The 16-bit page address of format B is set to the 16-bit page address of format A and by setting the RAM/ROM bit of format B indicating that it is a RAM pointer the promotion is implemented.

57. Promotion from __rom__small pointer into a __small pointer. It is a transition from format A to format B. The 16-bit page address of format B is set to the 16-bit page address of format A and by setting the RAM/ROM bit of format B indicating that it is a ROM pointer the promotion is implemented.

58,59. In line with the foregoing, the null pointer in block 76 can be promoted either via arrow 58 to __ram__small pointer, or via arrow 59 to __rom__small pointer. Implications of the choice amongst these two possibilities will be discussed hereinafter.

Generally, prior art has known the feature of promoting, such as according to arrows 53 or 54. Nevertheless, even these two promotion types have not been joined into a single organization, let alone combining these with the various other promotion types shown here.

Indirect Promotions

Given the Figure, and for the moment ignoring the null pointer block 76, there are two indirect promotions: the first one thereof is the promotion from a __ram__small pointer to a __big pointer, the second one is the promotion from a __rom__small pointer to a __big pointer. In principle, there are two routes for every such promotion. One can verify that these routes are commutative, i.e. whether the pointer is promoted via one or via the other of the different routes, it will always end up as the same pointer. The cause of this lies in the construction of the lattice. The address of the diagram fields that combine the features being {ram, rom, union_of_ram_rom} or {small, big} are mutually orthogonal in the respective formats.

Equality of Pointers

The inventors have recognized that after the above there is still an open issue regarding 'the equality of pointers' that may have different and unexpected results that do not conform to the ANSI-C standard referred to hereinafter. A particular question is: 'Is a __rom__small NULL pointer or a __ram__small NULL pointer near the NULL pointer comparable (equal) to the __small NULL pointer?' If the answer is NO, this is non compatible with ANSI-C. Another question is: 'If one assigns NULL to a particular pointer or pass a NULL value as an argument to a procedure that expects a pointer as an argument, is this pointer a RAM or ROM pointer?' In principle, there are two solutions, that are both caused by an associated choice given hereinafter.

These questions result from analyzing the promotion diagram. The case of the NULL pointer is an interesting one. If we have both a __ram__small NULL pointer and also have a __rom__small NULL pointer then these are comparable at the common lowest level of promotion in this case: __small pointer 74. But immediately the question rises whether they should be equal or different. As it turns out you can define them to be equal but also to be unequal.

A first choice is that they are considered equal: then the equality rest doesn't test on the RAM/ROM bit in case of a NULL address i.e. page address is zero (small pointer) or page and segment address are zero (big pointer). A drawback, in particular for embedded systems is that the equality test becomes more expensive in terms of speed and code size but on the other hand it is advantageously ANSI-C compatible.

A second choice is that they are considered unequal: then the equality test is simple and cheap but the system ends up with more than a single NULL pointer which does not conform to the ANSI-C standard.

The Print__String Example

To illustrate the advantages of the proposed solution, an example of a print__string example routine will be given, as in particular distinguishing from what has been common at the C language. The possibility of promoting or converting a pointer in the right instant is crucial. By promoting the ram pointer or rom pointer at the instant of argument passing, we allow usage of a small data format of the pointer and furthermore avoid code duplication. In fact, the next print__string routine works correctly for all pointer types:

```
void print__string (__big char * y)
{     char c;
      while (c = *y++)
      {     print__char (c);
      }
}
```

Compatibility of the Program with ANSI-C

The object of providing such compatibility is to render a program that has been provided with the additional key-words according to the invention compatibile through appropriate redefinition of the additional key-words. In particular, the mechanism chosen here, i.e. to ignore these additional key-words, is by putting them into include files. A preferred example is as follows.

Redefining the storage types into nothing may be done by including cxa.h: generally, a file "x.h" defines __big and other type specifiers into the empty string. Doing so will now result in optimal and semantically the same meaningful C programs without any code redundancy. Herein, the command cxa.h conventionally controls the striking of a list of words, in particular, through suppressing the __big prefix. If we further would choose the RAM-ROM union pointer as default, then the only thing the programmer needs to do in order to improve code and data size efficiency, is identifying the RAM-ROM pointers and variables. There will be no need to rewrite the program, in the sense of adding code.

Upward Compatibility of a Compiler

As a further example of the invention, the compatibility of the new compiler with the existing compiler for the well known 8051 microcontroller will be considered. Such compatibility will allow the use of old software in an extended hardware-software configuration. Only a limited amount of redefining can achieve this upward compatibility. Just like the solution for compatibility with ANSI-C, these definitions could redefine on a file like x.h the notions of __small, __far (the introduction of __far is needed for compatibility reasons, but just as the notion __far it is in fact a __small or __big(__huge) depending on the memory model) and __big.

This is also possible since the 8051 compiler has no notion of the union of the storage types __ram and __rom. Therefore it cannot be in one of the existing programs.

Further Comments

The invention allows to reuse of old software in an extended environment. Standard present-day hardware is sufficient. Old compilers can remain useful. The pointer promotion operations can be defined in the compiler system software. Generally, the invention through introducing elementary facilities allows an extremely broad scope of data and code manipulations to be executed in a single environment that needs no separate environment parts. The following references represent the state of the art:

ZORTECH C++ Compiler V3.0; MICROSOFT WINDOWS FUNCTION REFERENCE, Symantec Corporation, Cupertino Calif., 1991, p.749–753, as a reference on Data Types and Structures, as indicating that the enriched organization according to the invention allows improved data handling.

ZORTECH C ++ Compiler V3.0; FUNCTION REFERENCE, Symantec Corporation, Cupertino Calif., 1991, pp. 369–374, as illustrating the notion of the far package, referred to supra.

American National Standard for Information Systems—Programming Language C, ANSI-C X3.159-1989 American National Standards Institute, New York, USA, p.37, 38, 50, explaining the complex use of pointers and how they should behave. Generally, the ANSI-C standard for C indicates how under C the regular pointer usage should be effected.

Rationale for American National Standard for Information Systems—Programming Language—C (ANSI-C), p.74, Annex to the foregoing, explaining the old usage of the null pointer.

What is claimed is:

1. A method for implementing multiple format addressing in a microcontroller that has both ROM and RAM memory facility, processing facility, and bus facility for interconnecting the memory and processing facilities, said method comprising the steps of:

using a low address field for local addressing, and at least one facultative high address field for extended addressing; and providing said high address field in a first addressing format as a segment address, and in a second addressing format as containing a RAM/ROM selection bit.

2. A method as claimed in claim 1, further comprising the step of providing said high address field in a third addressing format as containing a RAM/ROM selection bit and a segment address in respective mutually exclusive fields.

3. A method as claimed in claim 1, wherein said RAM/ROM selection bit shares an elementary information unit with a straight address extension.

4. A method as claimed in claim 1, further comprising the steps of promoting a *_small pointer to a *_big pointer.

5. A method as claimed in claim 4, further comprising joining a first format _ram_* pointer and a first format _rom_* pointer to form a unified _* pointer of identical format as said first format.

6. A method as claimed in claim 1, further comprising providing a null pointer facility that is separately unique for RAM as distinct from ROM through separate promotion to _ram_small pointer (58) as different from promotion to _rom_small pointer (59), respectively.

7. A method as claimed in claim 1, further comprising providing a null pointer facility that is jointly unique for ROM and RAM through joined promotability to _small pointer (50).

8. A compiler program stored on a computer readable memory, said program being arranged for implementing multiple format addressing for a ROM and RAM memory facility through a low address field for local addressing, and at least one facultative high address field for extended addressing by providing said high address field in a first addressing format as a segment address, and in a second addressing format as containing a RAM/ROM selection bit.

9. A compiler program as claimed in claim 8, being arranged to provide said high address field in a third addressing format as containing a RAM/ROM selection bit and a segment address in respective mutually exclusive fields.

10. A compiler program as claimed in claim 8, being arranged wherein said RAM/ROM selection bit shares an elementary information unit with a straight address extension.

11. A compiler program as claimed in claim 8, being arranged to promote a *_small pointer to a *_big pointer.

12. A compiler program as claimed in claim 11, being arranged to join a first format _ram_* pointer and a first format _rom_* pointer to a unified _* pointer of identical format as said first format.

13. A compiler program as claimed in claim 8, being arranged to provide a null pointer facility that is separately unique for RAM as distinct from ROM through separate promotion to a _ram_small pointer as different from promotion to a _rom_small pointer, respectively.

14. A compiler program as claimed in claim 8, being arranged to provide a null pointer facility that is jointly unique for ROM and RAM through joined promotability to a _small pointer.

15. A microcontroller being arranged for implementing multiple format addressing for both ROM and RAM memory facilities by using a low address field for local addressing, and at least one facultative high address field for extended addressing and by providing said high address field in a first addressing format as a segment address, and in a second addressing format as a RAM/ROM selection bit.

16. A microcontroller as claimed in claim 15, being arranged to provide said high address field in a third addressing format as containing a RAM/ROM selection bit and a segment address in respective mutually exclusive fields.

17. A microcontroller as claimed in claim 15, being arranged wherein said RAM/ROM selection bit shares an elementary information unit with a straight address extension.

18. A microcontroller as claimed in claim 15, being arranged to promote a *_small pointer to a *_big pointer.

19. A microcontroller as claimed in claim 18, being arranged to join a first format _ram_* pointer and a first format _rom_* pointer to a unified _* pointer of identical format as said first format.

20. A microcontroller as claimed in claim 15, being arranged to provide a null pointer facility that is separately unique for RAM as distinct from ROM through separate promotion to a _ram_small pointer as different from promotion to a _rom_small pointer, respectively.

21. A microcontroller as claimed in claim 15, being arranged to provide a null pointer facility that is jointly unique for ROM and RAM through joined promotability to a _small pointer.

22. A microcontroller as claimed in claim 15, being functionally embedded in a larger solid state electronic structure.

\* \* \* \* \*